United States Patent
Sykes et al.

(10) Patent No.: US 10,711,675 B2
(45) Date of Patent: Jul. 14, 2020

(54) METHOD OF DETERMINING OPERATION OF AN SCR REDUCTANT DOSER

(71) Applicant: DELPHI TECHNOLOGIES IP LIMITED, St. Michael (BB)

(72) Inventors: Martin A. P. Sykes, Rainham (GB); Simon R. Panteny, Rochester (GB)

(73) Assignee: DELPHI TECHNOLOGIES IP LIMITED (BB)

( * ) Notice: Subject to any disclaimer, the term of this patent is extended or adjusted under 35 U.S.C. 154(b) by 220 days.

(21) Appl. No.: 15/781,872

(22) PCT Filed: Dec. 6, 2016

(86) PCT No.: PCT/EP2016/079937
§ 371 (c)(1),
(2) Date: Jun. 6, 2018

(87) PCT Pub. No.: WO2017/097776
PCT Pub. Date: Jun. 15, 2017

(65) Prior Publication Data
US 2018/0363529 A1    Dec. 20, 2018

(30) Foreign Application Priority Data
Dec. 8, 2015    (GB) .................................. 1521599.9

(51) Int. Cl.
F01N 3/20 (2006.01)
F01N 11/00 (2006.01)
(Continued)

(52) U.S. Cl.
CPC ......... F01N 3/2066 (2013.01); F01N 3/0842 (2013.01); F01N 3/208 (2013.01);
(Continued)

(58) Field of Classification Search
CPC .. F01N 11/00; F01N 2550/05; F01N 2610/02; F01N 2610/146; F01N 2900/1811; F01N 2900/1812; F01N 2900/1821; F01N 3/0842; F01N 3/2066; F01N 3/208; G01F 1/68; Y02T 10/24; Y02T 10/47
See application file for complete search history.

(56) References Cited

U.S. PATENT DOCUMENTS

2009/0035195 A1\* 2/2009 Robel .................... F01N 3/0231
422/177
2011/0262329 A1\* 10/2011 Ofoli .................. B01D 53/9477
423/213.2
(Continued)

Primary Examiner — Francis C Gray
(74) Attorney, Agent, or Firm — Joshua M. Haines

(57) ABSTRACT

In a selective catalytic reductant dosing system including a reductant injector adapted to inject liquid reductant into an exhaust line, a method of analyzing flow of reductant through the injector includes determining a measure of the temperature of the injector prior to activation of the injector. The method also includes activating the injector and determining a measure of the temperature of the injector subsequent to activation of the injector. The method also includes analyzing the flow of reductant through the injector consequential to the activation by analyzing changes in the measure of temperature of the injector prior to activation and the measure of temperature of the injector subsequent to activation.

11 Claims, 5 Drawing Sheets

(51) Int. Cl.
*F01N 3/08* (2006.01)
*G01F 1/68* (2006.01)

(52) U.S. Cl.
CPC ............... *F01N 11/00* (2013.01); *G01F 1/68* (2013.01); *F01N 2550/05* (2013.01); *F01N 2610/02* (2013.01); *F01N 2610/146* (2013.01); *F01N 2900/1811* (2013.01); *F01N 2900/1812* (2013.01); *F01N 2900/1821* (2013.01); *Y02T 10/24* (2013.01); *Y02T 10/47* (2013.01)

(56) References Cited

U.S. PATENT DOCUMENTS

| | | | |
|---|---|---|---|
| 2012/0006010 A1* | 1/2012 | Kaemingk | F01N 3/208 |
| | | | 60/286 |
| 2012/0023906 A1* | 2/2012 | Yezerets | F01N 3/208 |
| | | | 60/274 |
| 2012/0159928 A1* | 6/2012 | Liu | B01D 53/9431 |
| | | | 60/274 |
| 2013/0186470 A1 | 7/2013 | Offenhuber et al. | |
| 2014/0127097 A1 | 5/2014 | Lack et al. | |
| 2014/0245719 A1 | 9/2014 | Mitchell et al. | |
| 2015/0308314 A1* | 10/2015 | Axe | F01N 3/208 |
| | | | 423/210 |
| 2016/0131010 A1 | 5/2016 | Mitchell et al. | |
| 2018/0023450 A1* | 1/2018 | Zhang | F01N 9/00 |
| | | | 60/602 |
| 2018/0073408 A1* | 3/2018 | Kallen | F01N 9/00 |

* cited by examiner

METHOD OF DETERMINING OPERATION OF AN SCR REDUCTANT DOSER

CROSS REFERENCE TO RELATED APPLICATIONS

This application is a national stage application under 35 USC 371 of PCT Application No. PCT/EP2016/079937 having an international filing date of Dec. 6, 2016, which is designated in the United States and which claimed the benefit of GB Patent Application No. 1521599.9 filed on Dec. 8, 2015, the entire disclosures of each are hereby incorporated by reference in their entirety.

TECHNICAL FIELD

This disclosure relates to a system for dosing a reagent (typically a reductant such as urea) into the exhaust gas flow of an internal combustion engine, and specifically to a Selective Catalytic Reduction dosing system in a vehicle such as a Diesel vehicle. It has particular application in determining problems in reagent dosing (e.g. urea injectors).

BACKGROUND OF THE INVENTION

Reagent dosing systems such as Selective Catalytic Reduction (SCR) dosing systems are used in vehicles to reduce emissions such as nitrogen oxide (NOx) in the exhaust gas flow.

A known SCR dosing system doses a reagent (reductant) such as urea into an exhaust gas flow. The urea is converted into ammonia which assists in converting NOX gases. The system comprises a urea tank, a urea delivery module (UDM), and a feed line which feeds urea to a urea injector. The UDM may be adjacent, or fitted to, the urea tank. The urea injector acts to inject urea into the exhaust line. The UDM may integrate various components and sensors, a pump, filter, heater, temperature sensor, quality sensor, and urea level sensor. Typically the injector is cooled via a cooling system where cooling fluid is passed e.g. in a jacket around the injector. So, urea is delivered from the urea tank, via the UDM and the feed line to a dosing injector module comprising a solenoid injector.

Typically urea (dosing) injector comprises a solenoid operated urea injector which includes an actuator coil; such injectors typically operate in a similar fashion to fuel injectors.

The injector may be provided with a cooling system i.e. by passing a cooling fluid such as water adjacent to the injector e.g. via a cooling jacket. So, in known SCR dosing systems, pressurised urea is supplied to the (dosing) injector which may be fluid (e.g. water) cooled.

Reductant (urea) injectors may become blocked. Thus there is the potential of a failure due to an injector developing blocked nozzle orifices, due to e.g. deposits of urea crystals or exhaust deposits developing thereon. In such cases, the injector current profile, that is the current across the urea injector coil terminals is not affected, as the injector valve moves in the usual fashion. Thus, when trying to determine if injector nozzle have become blocked, one cannot rely on detection of this via detection of valve movement.

Some urea/reductant supply systems may be able to detect lack of flow there through; however most systems are unable to detect the lack of flow due to blocked nozzles/orifices.

It is an object of the invention to determine problems with reductant (e.g. urea) injection. It is a further object of the invention to provide an indication of blocked nozzles in a reductant (urea) injector.

SUMMARY OF THE INVENTION

In one aspect is provided, in a selective catalytic reductant dosing system including a reductant injector adapted to inject liquid reductant into an exhaust line, a method of analyzing flow of reductant through the injector comprising:

i) determining a measure of the temperature of the injector prior to activation of said injector;

ii) activating said injector;

iii) determining a measure of the temperature of the injector subsequent to said activation;

iv) analyzing the flow of reductant through said injector consequential to said activation by analyzing changes in the said determined measure of temperatures.

In step iv) the flow may be analysed by comparing said changes with expected changes in said measure of injector temperature subsequent to said activation.

Step iv) may comprise comparing the profile of the determined measure of temperature subsequent to activation of the injector with expected or known profiles of the measure of injector temperature subsequent to activation.

In step iv) the change in the measure of temperature at a time-point prior to and a point subsequent to activation is preferably determined. Said change in the measure of temperature is compared with an expected change of the measure of said temperature subsequent to activation.

Said change in the measure of temperature may be is determined from the difference between the maximum and minimum values of the measure.

From steps i) and iii) the gradient in the measure of injector temperature with respect to time may be determined.

The said gradient may be compared with an expected gradient.

Said gradient may be determined over said time period from the maximum and minimum values of the measure of temperature or vice versa.

The injector may be cooled by a cooling system comprising a cooling fluid passing adjacent to the injector.

The measure of temperature of the injector may be determined by a temperature sensor adjacent to the injector, injector coil, or the temperature of the coolant.

BRIEF DESCRIPTION OF DRAWINGS

The invention will now be described by way of example and with reference to the following figures of which.

PRIOR ART

It is known to detect and analyse injection operation of a SCR injector using the feedback current signal during an injection event. This can be performed by looking at the current flowing through the solenoid actuator coil of the injector to detect a valve movement. For example the point of inflection in the injector solenoid drive waveform will give information of valve events.

Figure 1:
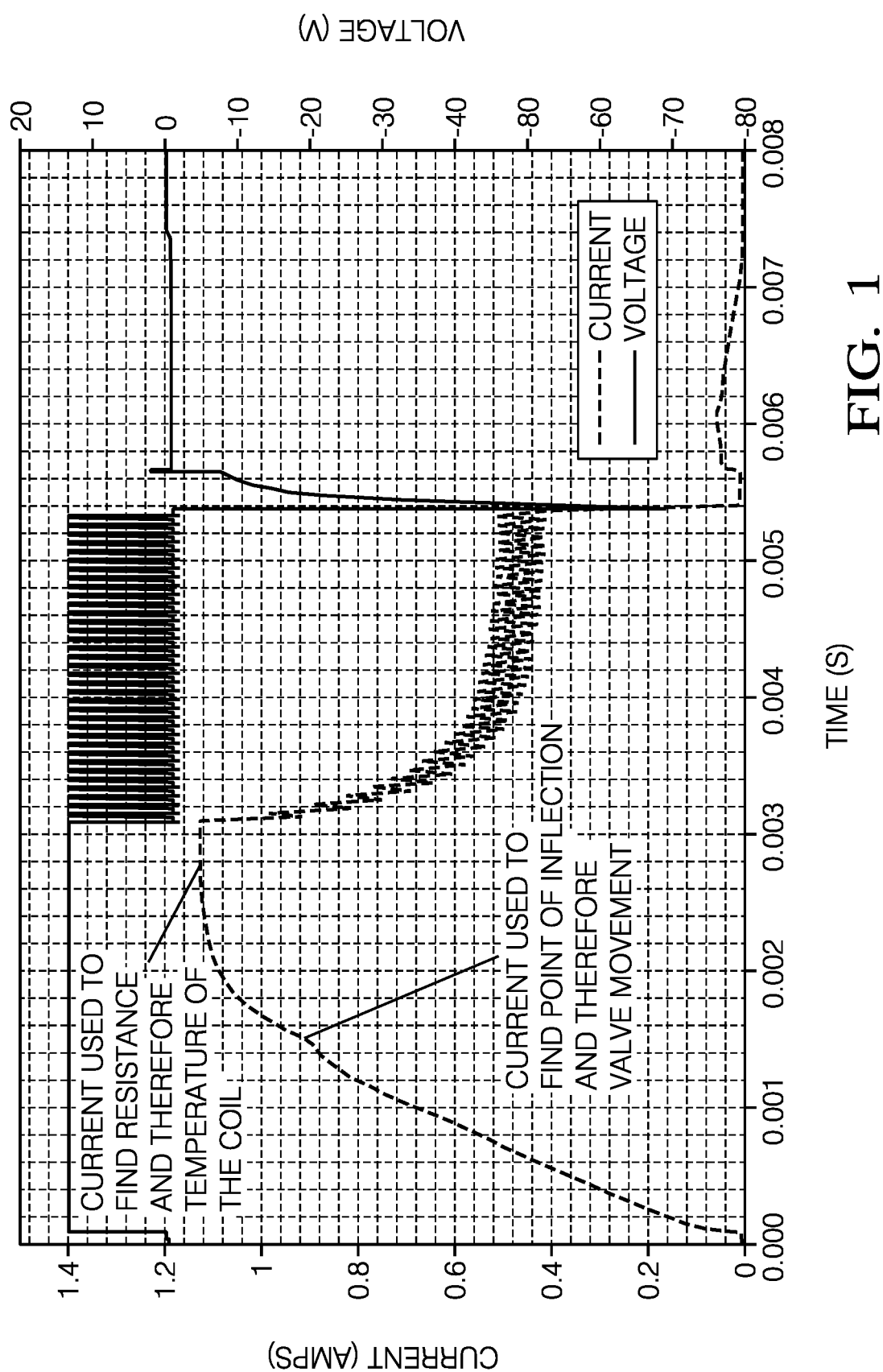
FIG. 1 shows plot of voltage across, and current through, the coil of a solenoid actuated urea injector during an injection event.

It is also known to be able to detect the temperature of a SCR injector coil using the feedback current from the injector coil terminals during an injection event. This method analyses the current flowing through the injector coil to estimate the coil resistance. The temperature is calculated based on the change in resistance. Typically the current for the latter method is determined at the point of maximum current. FIG. 1 which shows plot of voltage across, and current through, the coil of a solenoid actuated urea injector.

DETAILED DESCRIPTION OF THE INVENTION

In a simple example according to one aspect of the invention, the diagnosis of flow of reductant such as urea through a urea injector, is determined by obtaining a measure of, or analyzing the change in, temperature (or temperature profiles) of the SCR coil or injector as a result of the cooling effect of reductant such as urea flowing through the injector, (e.g. during an injection event) and comparing this with know or expected temperature of the coil (or temperature profiles during an injection event).

The temperature may be determined by provision of a temperature sensor located on or adjacent to the injector (particularly the injector coil). Alternatively an estimate may be provided by measuring the temperature of coolant flowing in the injector cooling system e.g. flowing in a cooling jacket.

FIG. 1 which shows plot of voltage across, and current through, the coil of a solenoid actuated urea injector.

Figure 2:
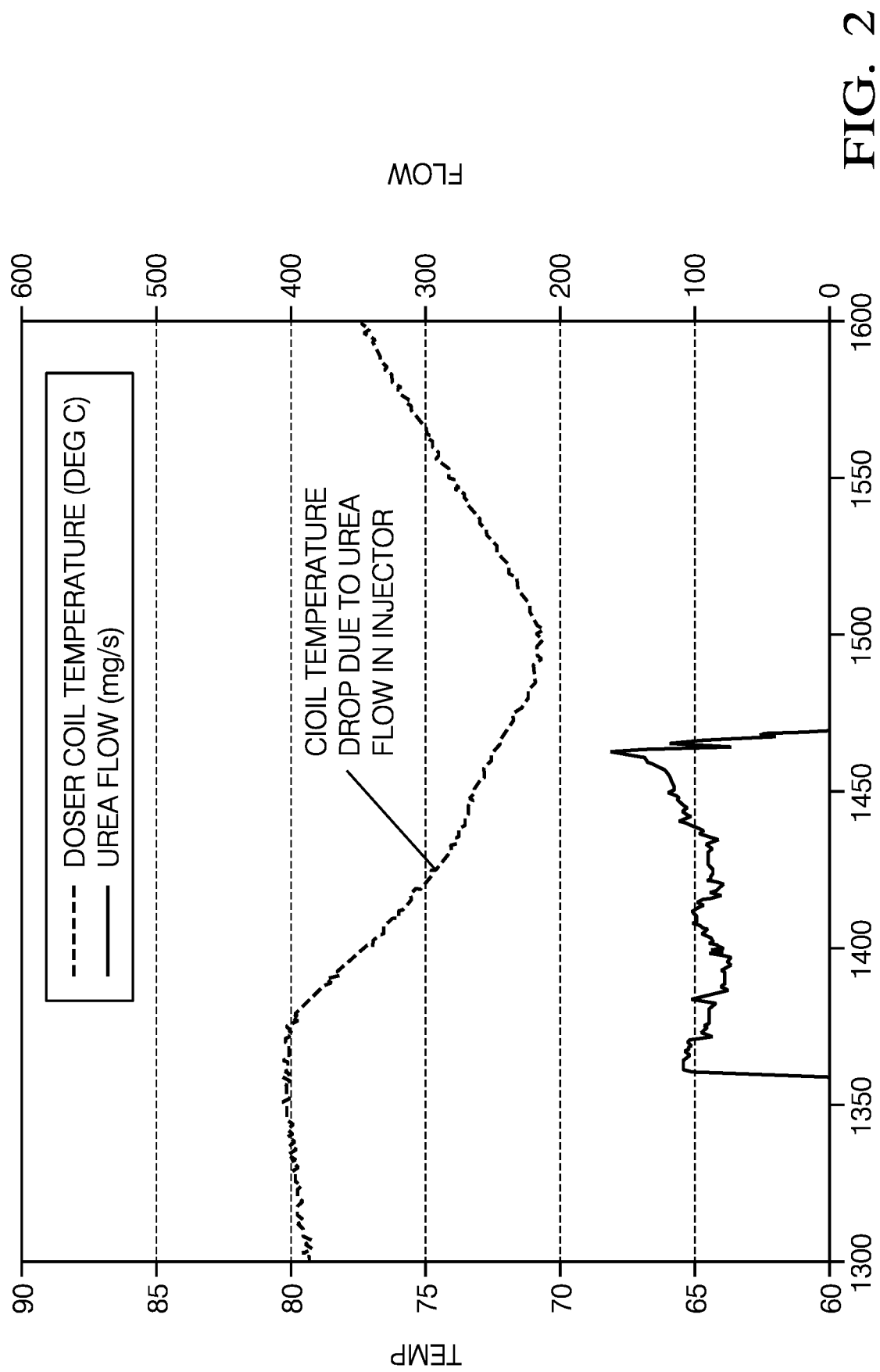
FIG. 2 shows the temperature profile of a coil of a urea injector over time with respect to a urea injection event (top) and the bottom plot shows the profile of urea flow from/through the injector.

FIG. 2 shows the temperature profile of a coil of a urea injector over time with respect to a urea injection event (top) and the bottom plot shows the profile of urea flow from/through the injector. When urea is injected, urea flows through the injector, thereby cooling the coil, as seem in the figure.

The injector may be cooled by coolant flowing through a coolant jacket. When no urea is flowing in the injector, the injector coil is heated to the temperature of the coolant flowing in the coolant jacket.

It is to be noted that the temperature of the supply of the reductant such as urea to the injector, (i.e. incoming urea temperature) is usually at a different temperature (usually lower) than the temperature of the coil or coolant.

Figure 3:
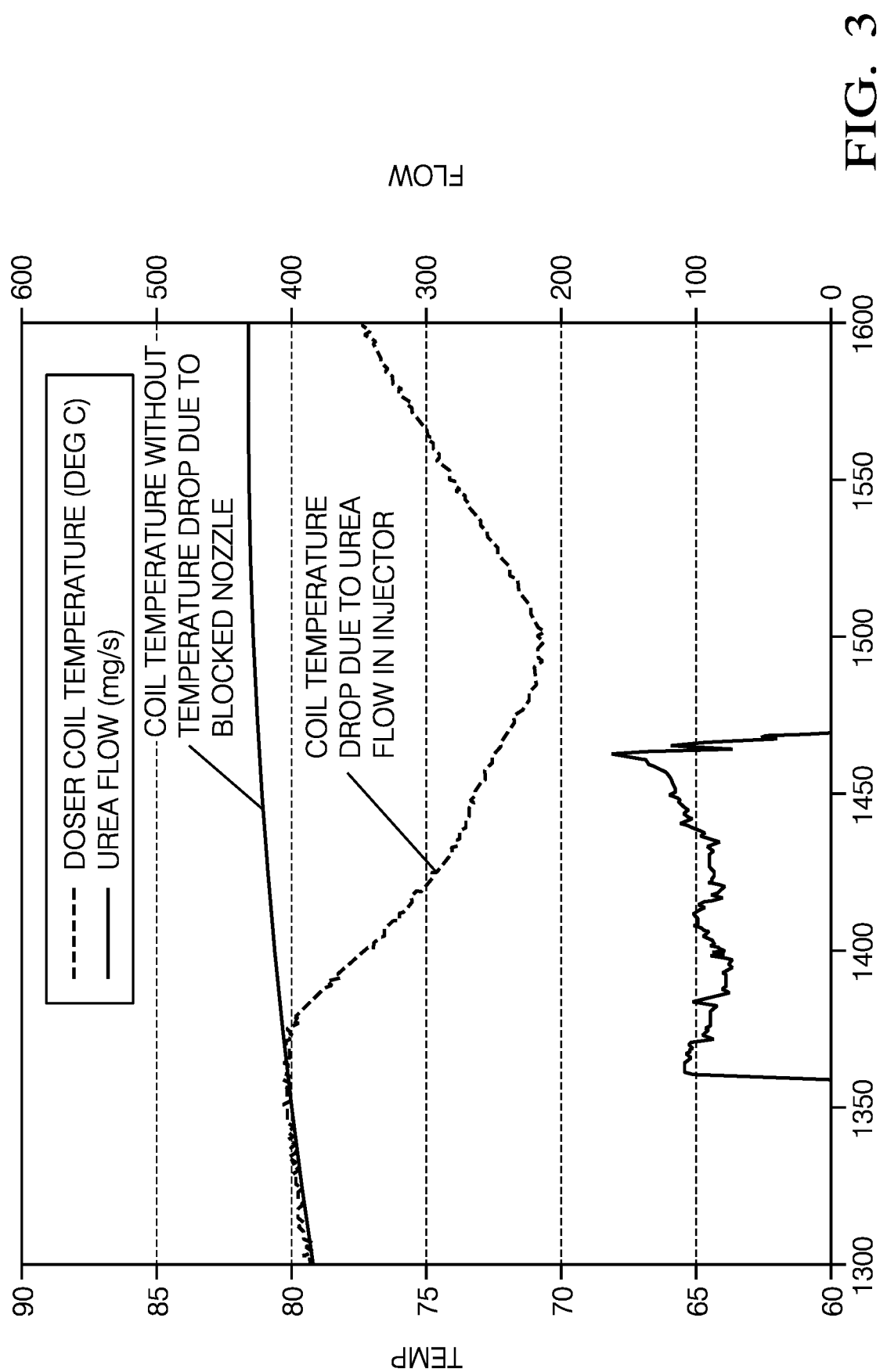
FIG. 3 compares the temperature profile of a reductant injector during an operating cycle to one which is blocked to one that is operating normally.

FIG. 3 compares the temperature profile of a injector which has become blocked (e.g, has a blocked nozzle) to one that is operating normally, during an operating cycle, i.e. injection event.

As can be seen, assuming the urea/reductant supplied to the injector is cooler than the injector, with the injector, the cooling effect will not be observed.

Figure 4:
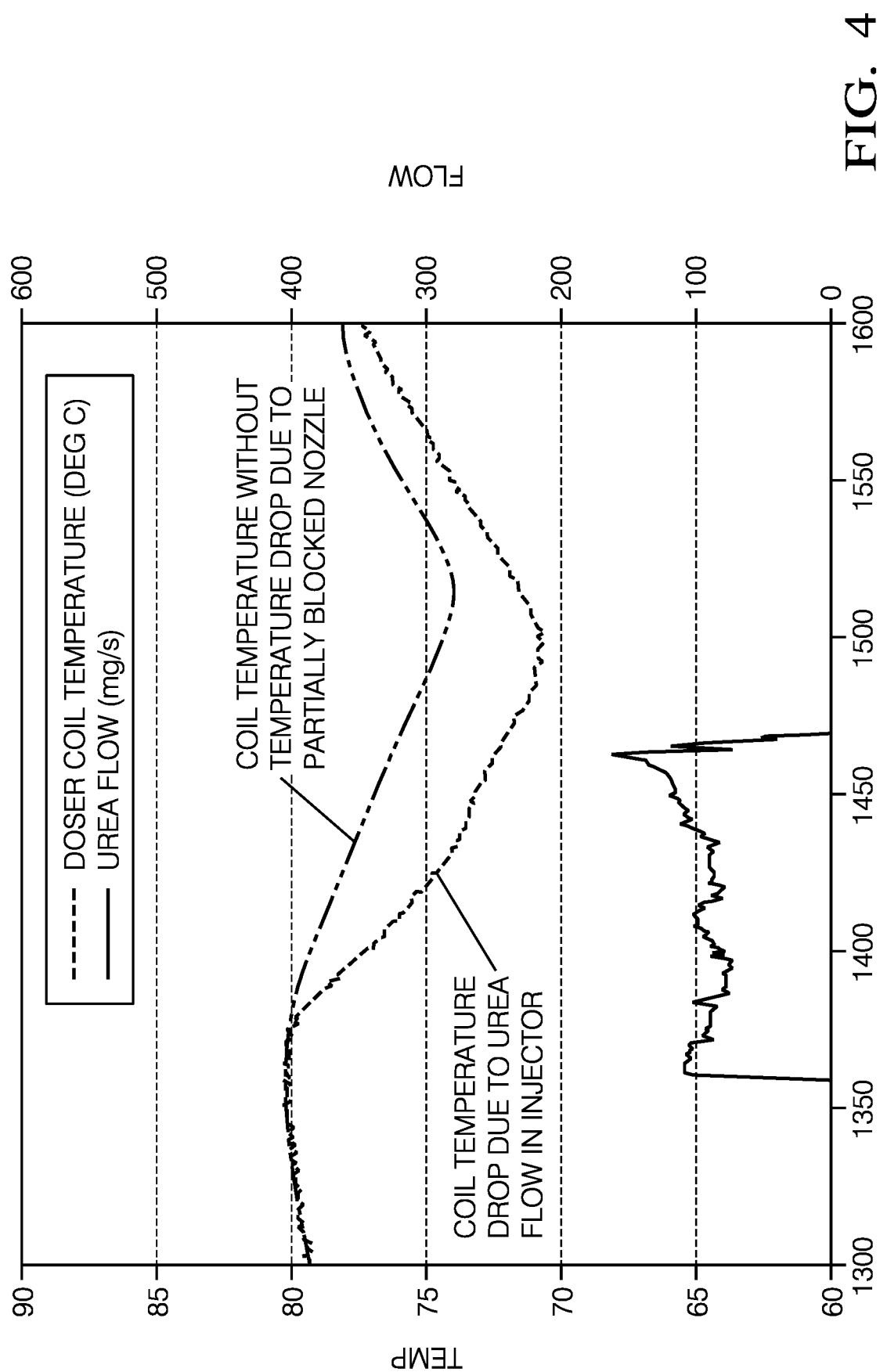
FIG. 4 compares the temperature profile of a coil for an injector operating normally and one which is partially blocked; and, FIG. 5 compares the temperatures slopes (gradients) of temperature profiles of a normally operating injector and that of a blocked injector, during an injection cycle.

Further, it is also possible to detect a partially blocked nozzle by a virtue of a reduced cooling flow of the urea. FIG. 4 compares the temperature profile of a injector coil for an injector operating normally and one which is partially blocked (during an injection cycle). As can be seen, there is a reduced cooling effect from the urea/reductant flow where there is a blocked nozzle.

The skilled person would understand there are various ways in which the temperature profile of the coil may be used to determine whether there is an impedance to flow.

Figure 5:
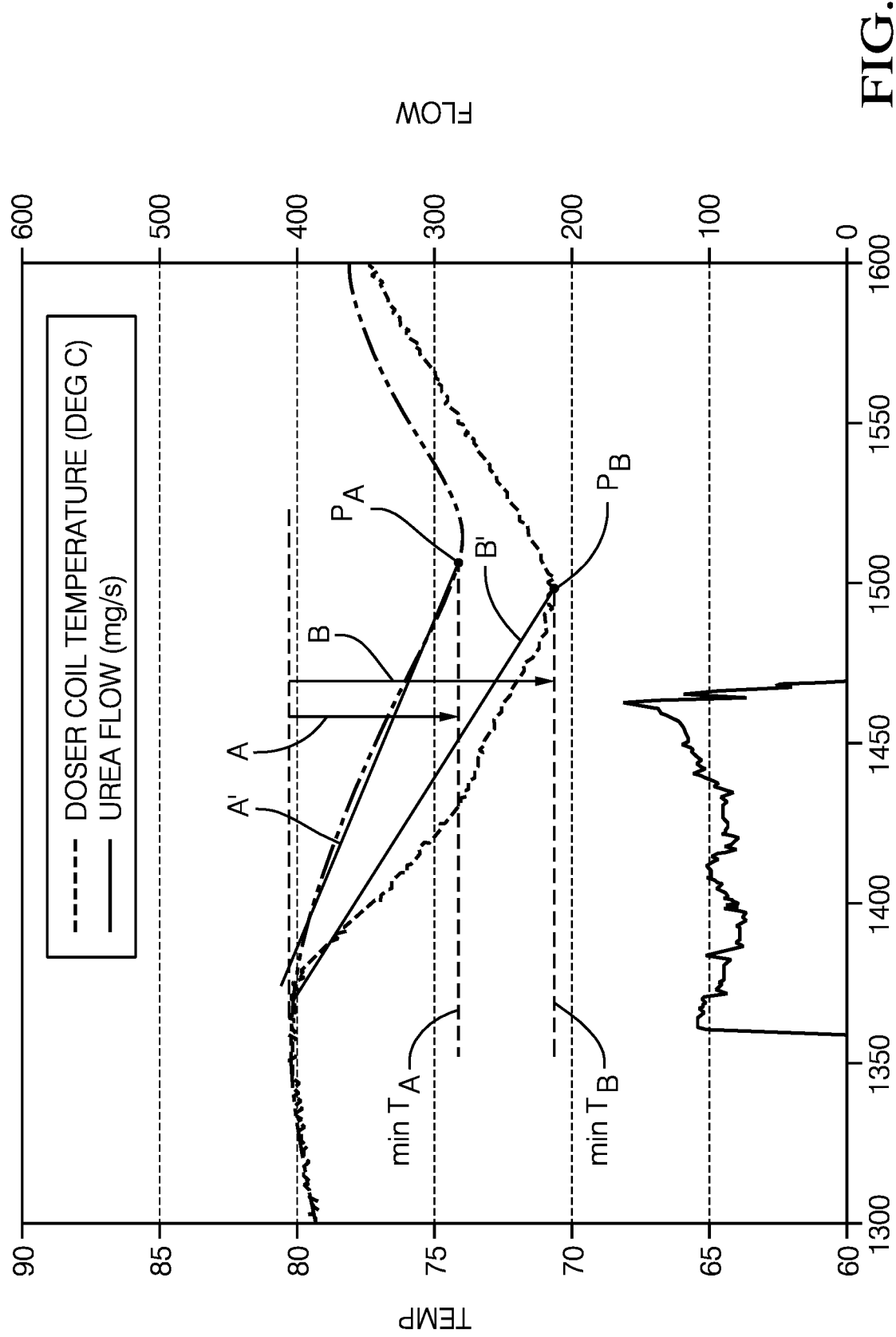

One measure may be determining the absolute temperature drop between two points such as the maximum temperature and the minimum temperature; this is shown in FIG. 5 for two cases, B) an injector operating normally and A) an injector with a (partially/fully) blocked nozzle. The absolute temperature drop for both cases subsequent to an injection event (or injector activation as no urea may be injected with a fully blocked nozzle) is shown by arrows B and A respectively.

In an alternative method the change in temperature of an injector with time (i.e. slope) is determined. This method may be performed at selected or suitable time points, and is preferably performed from the point during an injection/activation cycle from maximum temperature to minimum temperature i.e. looking at the slope from the maximum temperature to the minimum temperature in an injection cycle as shown in FIG. 5; the slopes for unblocked or partially blocked injector temperature are shown by B' and A' respectively.

In an alternative method, a modelled coil temperature based on heat flow in and out of the coil may be used, and this compared to the measured coil temperature from the current in the injector.

The invention claimed is:

1. In a selective catalytic reductant dosing system including a reductant injector adapted to inject liquid reductant into an exhaust line, a method of analyzing flow of reductant through the reductant injector comprising:
   i) determining a measure of the temperature of the reductant injector prior to activation of the reductant injector;
   ii) activating the reductant injector;
   iii) determining a measure of the temperature of the reductant injector subsequent to activation of the reductant injector;
   iv) analyzing the flow of reductant through the reductant injector consequential to activation of the reductant injector by analyzing a change in the measure of temperature prior to activation of the reductant injector and the measure of temperature of the reductant injector subsequent to activation of the reductant injector.

2. A method as claimed in claim 1, wherein in step iv) the flow is analyzed by comparing the changes with expected changes in the measure of temperature subsequent to activation of the reductant injector.

3. A method as claimed in claim 1, wherein step iv) comprises comparing a profile of the measure of temperature subsequent to activation of the reductant injector with expected or known profiles of the measure of temperature subsequent to activation of the reductant injector.

4. A method as claimed in claim 1, where in step iv) the change in the measure of temperature prior to activation of the reductant injector and the measure of temperature of the reductant injector subsequent to activation of the reductant injector at a time-point prior to activation and a point subsequent to activation is determined.

5. A method as claimed in claim 4, wherein the change in the measure of temperature is compared with an expected change of the measure of temperature subsequent to activation.

6. A method as claimed in claim 5, wherein the change in the measure of temperature is determined from the difference between a maximum value and a minimum value of the measure of temperature.

7. A method as claimed in claim 1, wherein from steps i) and iii) a gradient in the measure of temperature with respect to time is determined.

8. A method as claimed in claim 7, wherein the gradient is compared with an expected gradient.

9. A method as claimed in claim 7, wherein the gradient is determined over a time period from the maximum value and the minimum value of the measure of temperature or vice versa.

10. A method as claimed in claim 1, wherein the reductant injector is cooled by a cooling system comprising a cooling fluid passing adjacent to the reductant injector.

11. A method as claimed in claim 1, where the measure of temperature of the reductant injector is determined by a temperature sensor adjacent to the reductant injector, injector coil, or the temperature of coolant.

* * * * *